Patented July 12, 1938

2,123,300

UNITED STATES PATENT OFFICE 2,123,300

PROCESS FOR WORKING UP ZINC DUST

Kurt Rudolf Göhre, Frankfort-on-the-Main, Germany, assignor to American Lurgi Corporation, New York, N. Y., a corporation of New York No Drawing. Application September 15, 1937, Serial No. 164,065. In Germany September 21, 1936

5 Claims. (Cl. 75—71)

Zinc dust which contains cadmium usually is treated for the recovery of its zinc and cadmium contents by charging it into a zinc reduction furnace or muffle with carbon and heating to produce zinc which is relatively free of cadmium and a zinc dust which is richer in cadmium than the original dust. This operation may be repeated on the dust from the previous operation until a dust is produced which contains a sufficiently high proportion of cadmium to warrant its treatment by other known methods for the recovery of technically pure cadmium, cadmium salts, etc.

This process is, however, expensive in the use of material, fuel and labor, and the recovery of cadmium rarely amounts to as much as 60% of the cadmium content of the ore. At each treatment of the dust in the muffle it is necessary to add reducing carbon and a portion of the cadmium is converted into cadmium oxid and passes off with the gases from which it can be recovered only with difficulty and incompletely. The amount of carbon used is not as much as is required in the treatment of zinc ore, but still it is a substantial amount and the moisture and probably other oxidizing constituents contained in it are regarded as being responsible in part at least for the loss of cadmium through its conversion into cadmium oxid.

An object of the present invention is to provide a process for the recovery of cadmium from cadmium containing zinc dust in which the above described concentration by treatment in a zinc reduction furnace and the attending losses are avoided. The invention is based upon the idea that if it is possible to convert the cadmium content of zinc dust into a zinc-cadmium alloy, then the cadmium and zinc can be separated more simply and economically by rectification, for instance vacuum distillation or fractional distillation and condensation.

It has been found that by liquation of zinc dust which contains cadmium, for instance in an externally heated rotary muffle furnace, a cadmium-zinc alloy may be produced with a good yield or recovery of the cadmium and without the use of reducing agents. Some oxidic residues containing cadmium are also produced which will be referred to hereinafter. This alloy may be worked up into metallic zinc and metallic cadmium or a dust rich in cadmium by distillation. The product, rich in cadmium, which may still contain more or less zinc, may be used directly, for example, in the production of alloys or it may be used in the production of pure metallic cadmium or pure cadmium salts, for example, by dissolving it in acid and precipitating the cadmium by treating the solution with cadmium containing zinc dust.

When the process is started with a zinc dust which is poor in cadmium, an alloy or dust may be produced which still contains a large proportion of zinc. Such products may be subjected to a second treatment to enrich the cadmium content. For instance, if the first or any other rectification has been carried out for the production of a cadmium containing dust, which operation gives the greatest enrichment in cadmium content, the resulting dust may be liquated in an externally heated rotary drum as described above and the resulting alloy rectified for the production of metallic zinc and alloy rich in cadmium or a cadmium dust. In the same way the cadmium dust of a second or later rectification may be further treated.

For the rectification a rectifying apparatus of the type disclosed in United States patents referred to hereinafter, may be employed.

After one or more liquations and distillations, a cadmium alloy or a cadmium dust is produced which has a sufficiently high cadmium content for economical recovery of the cadmium in technically pure form.

The oxidic residue produced by the liquation of the zinc dust is treated independently or together with other material containing zinc and having about the same cadmium content in a zinc reducing furnace thereby producing zinc poor in cadmium and dust rich in cadmium and the latter can then be treated for the recovery of cadmium in accordance with the invention.

The utilization of the metal which has been sufficiently enriched in cadmium, or the dust or the alloy melted out of the dust, can be carried out in accordance with known processes, for instance, according to the process described in U. S. Patent No. 2,074,806. According to this patent, cadmium sponge is made from starting material containing cadmium by cementation, the bulk of the water or solution adhering to the sponge is removed by pressing, and the pressed wet sponge is introduced into a caustic alkali melt in which the cadmium is melted and purified. Or the dust or alloy which has been sufficiently enriched in cadmium may be dissolved and the cadmium content of the solution converted into cadmium sulfid by precipitation with hydrogen sulfid.

The invention is illustrated by the following specific example:

A zinc dust containing 88% of metallic zinc and 4.2% of metallic cadmium was first melted out in an externally heated rotary drum, in which the dust, as dry as possible, was heated not much above the melting point of the zinc. The cadmium alloy so obtained by liquation was then rectified in apparatus such as that disclosed in United States patents referred to hereinafter. Zinc free from cadmium and cadmium dust that contained up to 70% cadmium was obtained.

This dust can be worked up directly to cadmium sponge and metallic cadmium or cadmium compounds.

As will be apparent from the foregoing description, while numerous combinations of the steps of liquation and rectification upon the original zinc dust and upon the alloys and dusts produced, are possible, the essence of the invention resides in the combination of steps consisting in liquating a cadmium containing zinc dust to the production of a zinc-cadmium alloy enriched in cadmium and in the rectification of this alloy to produce a dust which is rich in cadmium. Dusts containing both zinc and cadmium are liquated, zinc-cadmium alloys are distilled or rectified, and oxidic residues of liquation are subjected to the known reducing operation and the products returned to the process of the present invention. Liquation of the cadmium-zinc dusts produces cadmium-zinc alloys and oxidic residues. Rectification of the cadmium-zinc alloys may produce zinc which is relatively free of cadmium and a cadmium-zinc dust.

The rectifying apparatus above mentioned which may be employed for recovering cadmium from cadmium-zinc alloys, by distillation or fractional distillation are described by way of example in the following Patents 1,749,126, 1,799,166, 1,799,278, 1,973,295, 1,973,300, 1,980,480, 1,994,345, 1,994,347, 1,994,348, 1,994,349, 1,994,350, 1,994,351, 1,994,352, 1,994,353, 1,994,354, 1,994,355, 1,994,356, 1,994,357, and 1,994,358.

The New Jersey process for eliminating cadmium from zinc is substantially characterized in that molten zinc is caused to trickle down a column, e. g., constructed of carbon silicide and designed in the known manner of reflux condensers, over a series of trough- or tray-shaped plates bringing the zinc simultaneously to such a temperature as corresponds to the boiling point of cadmium in zinc. This apparatus is heated in the bottom part, while the top is only protected against radiation losses. The zinc freed from cadmium collects in a vessel placed under the column, while the cadmium vapours are introduced into a condenser of usual design, where they are precipitated in the form of metal or dust containing only traces of zinc. The non-heated part obtains such a temperature that there is a precipitation of evaporated zinc while the liberated evaporation heat of the zinc causes the immediate distillation of the cadmium that was condensed together with the precipitated zinc. Hence, the ascending cadmium vapours are constantly encountering the zinc trickling down and distributed over the various trays thus forming a large surface.

I claim:

1. Process for working up zinc dust which contains cadmium which comprises liquating the dust in the absence of reducing agent and subjecting the resulting cadmium-zinc alloy to rectification.

2. Process as defined in claim 1 in which the rectification is carried out so as to produce a dust containing cadmium and zinc.

3. Process for working up zinc dust containing cadmium which comprises subjecting the dust to liquation in the absence of a reducing agent thereby producing a cadmium-zinc alloy enriched in cadmium and an oxidic residue, subjecting said oxidic residue to reduction, thereby producing zinc poor in cadmium and a dust relatively rich in cadmium, subjecting the last named dust to liquation to produce a cadmium-zinc alloy and subjecting said alloy to rectification.

4. Process for working up zinc dust which contains cadmium which comprises liquating the dust in a rotary drum heated externally in the absence of reducing agent and subjecting the resulting cadmium-zinc alloy to rectification.

5. Process for working up zinc dust which contains cadmium which comprises liquating the dust in a rotary drum heated externally in the absence of reducing agent and subjecting the resulting cadmium-zinc alloy to rectification by fractional distillation thereby producing zinc free of cadmium and a metallic material rich in cadmium.

KURT RUDOLF GÖHRE.